Figure 1:
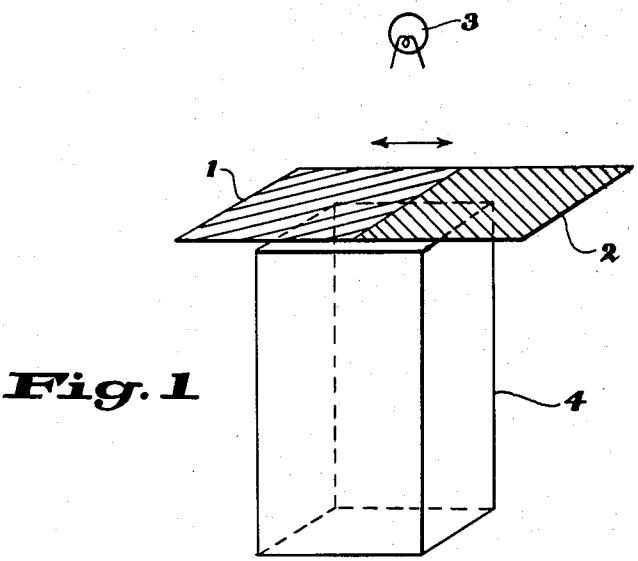

May 14, 1963

R. W. G. HUNT 3,089,386

METHOD OF CONTROLLING THE SPECTRAL
COMPOSITION OF A LIGHT SOURCE
Filed Jan. 8, 1959

Robert W. G. Hunt
INVENTOR.

BY R. Frank Smith

Karl T. Haramundanis
ATTORNEYS

United States Patent Office 3,089,386
Patented May 14, 1963

3,089,386
METHOD OF CONTROLLING THE SPECTRAL COMPOSITION OF A LIGHT SOURCE
Robert W. G. Hunt, Wealdstone, England, assignor to Eastman Kodak Company, Rochester, N.Y., a corporation of New Jersey
Filed Jan. 8, 1959, Ser. No. 785,640
Claims priority, application Great Britain July 25, 1958
4 Claims. (Cl. 88—111)

The present invention relates to the control of illuminants for use in color measurement and color reproduction.

In apparatus used for color measurement and color reproduction it is often necessary to provide means for adjusting separately the amounts of red, green, and blue in a beam of light. A simple way of doing this is by means of filters: a yellow dye or glass is used to control the amount of blue, a magenta to control the amount of green, and a cyan (blue-green) to control the amount of red. It is not difficult to find yellow dyes or glasses which have little or no effect on the green and red contents of the beam, but commonly available magenta dyes and glasses affect the blue as well as the green content of the beam, and commonly available cyan dyes and glasses affect the green and blue as well as the red content of the beam.

It is an object of the present invention to counteract the effects of these unwanted absorptions in the filters.

In accordance with one form of the present invention there is provided a method of introducing into a light beam to a varying extent a colored filter having a greater transmission in one region of the spectrum and a lesser transmission in another region of the spectrum and keeping constant with total absorption of light in the region of said greater transmission, which consists in maintaining in the part of the light beam not intercepted by said colored filter, a correcting light filter having substantially the same transmission in the region where the said colored filter has a greater transmission and having a greater transmission in the region where the said colored filter has its lesser transmission.

In this form of the invention it is required that the filters be so placed in the beam that they are completely out of focus with respect to the final image obtained. In this situation different degrees of filtration are obtained by inserting the filters into the beam by different amounts. Thus a yellow filter, when fully out of the beam, allows all the blue light to pass, when fully in the beam allows only that fraction of blue light to pass which it does not absorb, and when in intermediate positions allows different intermediate fractions of blue light to pass.

According to a modified form of the invention there is provided a method of introducing into a light beam to a varying extent a colored wedge having a greater transmission in one region of the spectrum and a lesser transmission in another region of the spectrum, and keeping constant the total absorption of light in the region of said greater transmission, which consists in maintaining in superimposed relationship with the colored wedge, a correcting wedge which is wedged in the opposite direction to the colored wedge and of such a color that the combination has at all points along its length substantially the same transmission in the region where the said colored wedge has a greater transmission.

Preferably, in both forms of the invention, the correcting filter or wedge is of such color that it transmits as much light as possible in that region of the spectrum where the colored filter or wedge has its lesser transmission.

Figure 2:

In order that the invention may be clearly understood, several forms thereof will now be described, by way of example, with reference to the accompanying drawings, in which:

FIG. 1 shows diagrammatically a filter-pair for carrying into effect the method of controlling an illuminant in accordance with one form of the invention; and FIG. 2 shows diagrammatically a composite wedge for carrying into effect the method according to a modified form of the invention.

As shown in FIG. 1, a colored filter 1 is cemented to a correcting filter 2, or the two filters may be mounted side by side in a frame or the two filters may be fixed or coated side by side on a single piece of glass, or otherwise mounted side by side. Light from a light source 3 passes through one or both of the filters 1 and 2 and into an integrating box 4 having internally reflecting surfaces formed by four mirrors, the ends of the box being closed by two diffusers comprising opalized sheet material. The integrating box 4 may be replaced by any known light-integrating device, such as a light-integrating block made of any transparent material, such as glass or clear plastic material, having polished walls, or the filter combination 1 and 2 may be so positioned in an optical system of lenses and/or mirrors that it is completely out of focus with respect to the final image.

The colored filter 1 has a greater transmission in one region of the spectrum and a lesser transmission in another region of the spectrum. In the region where the colored filter 1 has the greater transmission the correcting filter 2 has a transmission which is substantially the same. This will be seen clearly from the following table:

| Colored Filter | | | Correcting Filter | |
| --- | --- | --- | --- | --- |
| Name | Greater Transmission | Lesser Transmission | Region of same transmission as colored filter | Region of transmission greater than that of the colored filter |
| Cyan | Blue and Green | red | Blue and Green | red. |
| Magenta | Blue and Red | green | Blue and Red | green. |
| Yellow | Red and Green | blue | Red and Green | blue. |

The two filters 1 and 2 are mounted for movement as a unit across the path of the light beam from the light source so that as one filter is introduced into the light beam, the other filter is withdrawn. Assuming that the colored filter 1 is cyan and is fully withdrawn from the light beam, the correcting filter 2 will have the same blue and green absorptions as the cyan filter and will be disposed fully in the light beam. As the cyan filter is introduced into the light beam, the correcting filter will be progressively withdrawn from the light beam so that in all positions of the filters the light beam will be exactly covered by one or the other of the filters or by a part of both. If desired the filters may overlap or have a gap therebetween, but in such cases they must be mounted for movement in such a manner that the overlapping portions of the filters or the gaps therebetween are always located in the path of the light beam.

Because the correcting filter has the same green and blue absorptions as the cyan filter adjustment of the position of the filter-pair in the beam makes no difference to the blue or green content of the beam, the only variation taking place being that of the red content of the beam. The filter-pair thus provides a means for adjusting the red content independently of the green and blue contents of the beam, and hence the effects of the unwanted green and blue absorptions of the cyan dye or glass are counteracted.

Similarly if the colored filter 1 is magenta or yellow, and the correcting filter is as shown in the above table, the filter-pair provides a means for adjusting the green content independently of the red and blue contents, or the blue content independently of the red and green contents, respectively. Hence the effects of the unwanted absorptions of the magenta and yellow dyes or glasses are counteracted.

As shown in FIG. 2, the filters can be made in the form of dye or glass wedges 5 and 6, in which the absorption gradually increases from one end to the other and these wedges can be moved across the light beam from a light source 7 so as to give different degrees of absorption. For example, by attaching to a cyan colored filter wedge 5 a correcting filter wedge 6 which is wedged in the opposite direction, it is possible by careful choice of the color and density of the constituent wedges to obtain a composite wedge in which only the red absorption varies from one end to the other, the green and blue absorptions remaining constant. Movement of such a composite wedge 5, 6 in the light beam thus enables its red content to be varied independently of its green and blue contents and similar composite wedges can be constructed to provide independent control of the green and blue contents of the beams. If such wedges are used in conjunction with short compensating wedges 8 and 9 which are similar to a section of the light end of each colored wedge 5 and 6, respectively, but mounted with the wedgings in the opposite directions, i.e. wedge 8 is similar to wedge 5 and wedge 9 is similar to wedge 6, then the device does not have to be used out of focus with respect to the final image obtained. The compensating wedges are stationary and are sufficiently large to extend completely across the path of the light beam as defined by an apertured plate 10.

The invention has been described in detail with particular reference to preferred embodiments thereof, but it will be understood that variations and modifications can be effected within the spirit and scope of the invention as described hereinabove and as defined in the appended claims.

Having thus described my invention, what I claim as new and desire to secure by Letters Patent of the United States is:

1. The method of varying the spectral composition of a beam of light containing colors of at least two regions of the spectrum to vary the amount of light in only one of said regions while maintaining the amount of light in the other region substantially constant, comprising adjustably inserting a color filter into said beam which has a greater transmission in one of said regions of the spectrum and a lesser transmission in another region of the spectrum and keeping constant the total absorption of the light in the region of said greater transmission as said color filter is inserted into said beam by varying amounts, including fully in and completely out of said beam, to counteract for unwanted absorptions of the color filter by adjustably inserting a correcting filter into said beam to an extent commensurate with the adjustment of said color filter but in an opposite sense, said correcting filter having substantially the same transmission in the region where said color filter has a greater transmission and having a greater transmission in the region where said color filter has its lesser transmission.

2. The method of varying the spectral composition of a beam of light containing red, green and blue regions of the spectrum to vary the amount of light in only one of said regions comprising inserting into said light beam to a varying extent a color filter having a greater transmission in the two regions of the spectrum not to be varied and a lesser transmission in the region to be varied, and keeping constant the total absorption of the light in said first-mentioned two regions of greater transmission as said color filter is inserted into said beam by varying amounts to counteract for unwanted absorptions of the color filter in said first-mentioned two regions of the spectrum by adjustably inserting a correcting filter into said beam to an extent commensurate with the adjustment of said color filter but in an opposite sense, said correcting filter having substantially the same transmission in the region where said color filter has a greater transmission and having a greater transmission in the region where said color filter has its lesser transmission.

3. The method of varying the spectral composition of a beam of light according to claim 2 in which the color filter is such that its absorption for the different regions of the spectrum gradually increases from one end to the other in the direction it is to be moved relative to said light beam, and in which the step of keeping constant the total absorption of the light in said region of greater transmission as said color filter is moved across the light beam comprises fixing in superposed relation with said color filter a correcting filter whose absorption for the different regions of the spectrum gradually increases from one end to the other but in a direction opposite to that of the color filter.

4. The method of varying the spectral composition of a beam of light containing colors of at least two regions of the spectrum to vary the amount of light in only one of said regions while maintaining the amount of light in the other region substantially constant comprising adjustably inserting into said beam a color filter which has a greater transmission in one of said regions of the spectrum and a lesser transmission in the other region of the spectrum, and maintaining in the part of said light beam not intercepted by said color filter a correcting light filter having substantially the same transmission in the region where said color filter has a greater transmission and having a greater transmission in the region where said color filter has its lesser transmission to counteract for unwanted absorptions of the color filter and keep constant the total absorption of the light in the region of said greater transmission as said color filter is inserted into said beam by varying amounts, including fully in and completely out of said beam.

References Cited in the file of this patent
UNITED STATES PATENTS

| 2,213,382 | Busse | Sept. 3, 1940 |
| 2,272,646 | Schmidt et al. | Feb. 10, 1942 |
| 2,934,172 | Christie | Apr. 26, 1960 |